JOHN A. GERHART.
Improvement in Wagon Brakes.
No. 121,772.            Patented Dec. 12, 1871.
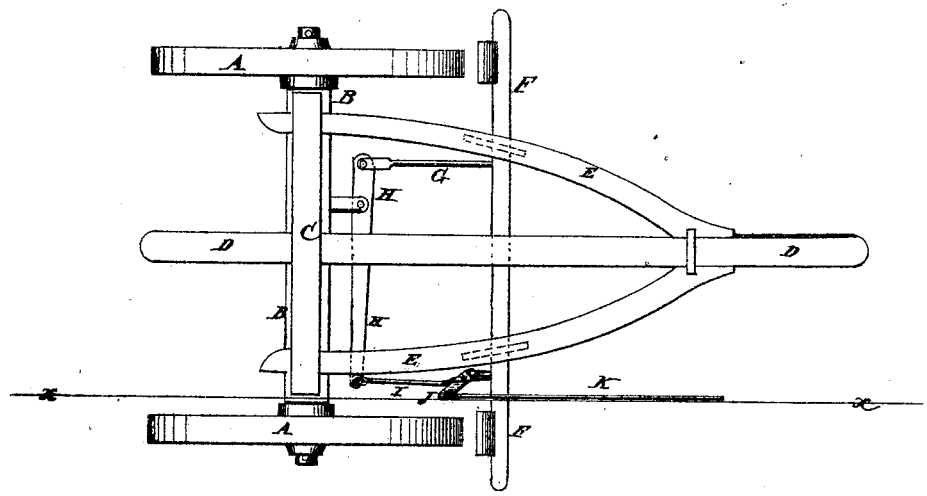
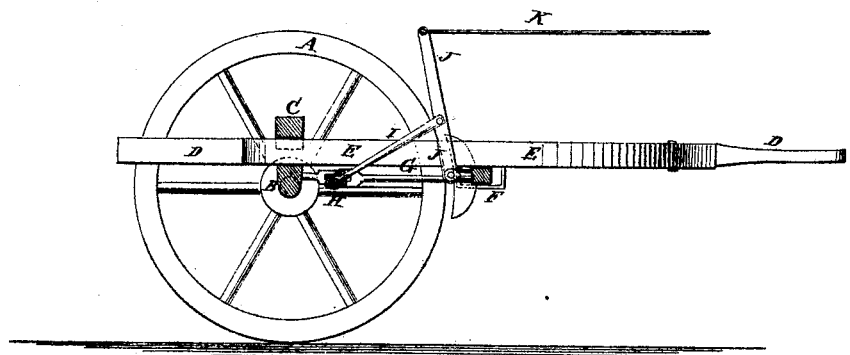
Witnesses:            Inventor:
A. W. Almqvist,
Francis McArdle.            John A. Gerhart,
Per
Attorneys.

// 121,772

UNITED STATES PATENT OFFICE.

JOHN A. GERHART, OF EASTON, PENNSYLVANIA.

IMPROVEMENT IN WAGON-BRAKES.

Specification forming part of Letters Patent No. 121,772, dated December 12, 1871.

*To all whom it may concern:*

Be it known that I, JOHN A. GERHART, of Easton, in the county of Northampton and State of Pennsylvania, have invented certain Improvements in Wagon-Brake; and I do hereby declare that the following is a full, clear, and exact description thereof, which will enable others skilled in the art to make and use the same, reference being had to the accompanying drawing forming part of this specification, in which—

Figure 1 is a top view of the rear part of a wagon-gearing to which my improved brake has been attached. Fig. 2 is a side view of the same, partly in section, through the line $x\,x$, Fig. 1.

Similar letters of reference indicate corresponding parts.

My invention is an improvement in the class of wagon-brakes wherein a lever is arranged horizontally beneath the wagon-body in such a manner as to operate the brake-bar through a connection established therewith by means of rods; and the invention consists in the particular arrangement, hereinafter described, whereby I provide a brake combining, in a pre-eminent degree, economy in manufacture, simplicity of construction, and ease and efficiency of operation.

A represents the rear wheels, B the rear axle, C the bolster, D the reach, and E the rear hounds of a wagon, about the construction of which parts there is nothing new. F is the brake-bar, to the end parts of which the brake-shoes are attached in the ordinary manner. The brake-bar F is supported in place by keepers attached to the under side of the hounds E. To the brake-bar F, about midway between its center and one end, is attached the forward end of a connecting-rod, G, the rear end of which is pivoted to the end of the short arm of the lever H. The lever H is pivoted to a stud or other support attached to the axle B, and to the end of its long arm is pivoted the rear end of the connecting-rod I, the forward end of which is pivoted to the lever J. The lower end of the short arm of the lever J is pivoted to the brake-bar F, and to its upper end is pivoted the rear end of the rod or chain K, which extends forward along the wagon-body, and its forward end is attached to a foot or hand-lever in the ordinary manner.

By this arrangement a great advantage of leverage is obtained, so that the brake may be readily applied with any desired force to the wheels.

Having thus described my invention, I claim as new and desire to secure by Letters Patent—

The lever H having its shorter arm connected with the brake-bar by rod G and its longer arm with the opposite end thereof by the rod I and lever J, to which the operating rod or cord K is attached, all constructed, arranged, and operating as shown and described.

JOHN A. GERHART.

Witnesses:
  WILLIAM J. KOCHER,
  WILLIAM H. MIXSELL.    (31)